United States Patent
Yang

(10) Patent No.: US 8,101,874 B2
(45) Date of Patent: Jan. 24, 2012

(54) WATERTIGHT JUNCTION BOX

(75) Inventor: Jerry S. C. Yang, Taichung (TW)

(73) Assignee: Smart Electric Works Co., Ltd., Chang Hua Hsien (TW)

( * ) Notice: Subject to any disclaimer, the term of this patent is extended or adjusted under 35 U.S.C. 154(b) by 337 days.

(21) Appl. No.: 12/607,061

(22) Filed: Oct. 28, 2009

(65) Prior Publication Data

US 2011/0095020 A1     Apr. 28, 2011

(51) Int. Cl.
*H01R 13/502* (2006.01)

(52) U.S. Cl. ............ 174/559; 385/55; 241/36; 600/158; 439/158; 439/190; 439/921; 166/297; 29/595

(58) Field of Classification Search .................. 174/559; 385/55; 241/36; 600/158; 439/158, 190, 439/921; 166/297; 29/595
See application file for complete search history.

(56) References Cited

U.S. PATENT DOCUMENTS

| 3,649,952 | A | * | 3/1972 | Harmon | 439/158 |
| 4,290,486 | A | * | 9/1981 | Regalbuto | 166/297 |
| 4,679,233 | A | * | 7/1987 | Richardson et al. | 379/433.02 |
| 5,439,180 | A | * | 8/1995 | Baughman et al. | 241/36 |
| 6,131,267 | A | * | 10/2000 | Van Den Berg | 29/595 |
| 6,485,412 | B1 | * | 11/2002 | Byrne | 600/158 |
| 2005/0286834 | A1 | * | 12/2005 | Aldridge et al. | 385/55 |

* cited by examiner

*Primary Examiner* — Xiaoliang Chen
(74) *Attorney, Agent, or Firm* — Pai Patent & Trademark Law Firm; Chao-Chang David Pai

(57) ABSTRACT

A watertight junction box includes a box body, a lower floating plate, an upper floating plate, a lock cap, a modular cable inserted into the box body and kept in contact with sharp copper contacts, a holding down plate for holding down an external power wire on the upper floating plate to cause electric contact between the external power wire and the sharp copper contacts, and a predetermined amount of silicon rubber filled in between the lower and upper floating plate that is deformed to wrap about the connection area between the sharp copper contacts and the external power wire when the lock cap is tightly fastened to the box body to force down the holding down plate.

11 Claims, 6 Drawing Sheets

WATERTIGHT JUNCTION BOX

BACKGROUND OF THE INVENTION (a) Field of the Invention

The present invention relates to junction boxes and more particularly to a watertight junction box, which facilitates rapid installation of wires and effectively prevents the permeation of water.

(b) Description of the Prior Art

When connecting two electric wires together, the most commonly used method is to cut off the outer insulation of the connection end of each of the two electric wires, then to twist the bare metal conductors of the two electric wires together, and then to wrap the connection between the two electric wires with an insulative tape. Further, a junction box may be used for the connection of two electric wires. U.S. Pat. No. 5,499,931 discloses a lamp conducting structure in which power wires are pressed by the lower frame top central cylinder to cause the conductive metal clip sharp needle to cut off the outer insulations of the power wires to contact with the metal part of the power wires. This design is for indoor application, allowing the lamp to be easily connected with power wires of different thickness. However, this design cannot prevent the permeation of water. When used outdoor, rainwater may leak in, resulting in oxidation of the conductive metal clip sharp needle and shortening the work life.

SUMMARY OF THE INVENTION

The present invention has been accomplished under the circumstances in view. It is one object of the present invention to provide a watertight junction box, which utilizes a piece of silicon rubber to wrap about the connection area between the copper contacts and the installed power wire, protecting the copper contacts against oxidation and assuring a long service life and conductive stability.

It is another object of the present invention to provide a watertight junction box, which utilizes a piece of silicon rubber to assure watertight sealing and allows repeated use of the junction box without lowering its watertight sealing function.

DETAILED DESCRIPTION OF THE PREFERRED EMBODIMENTS

Figure 1:
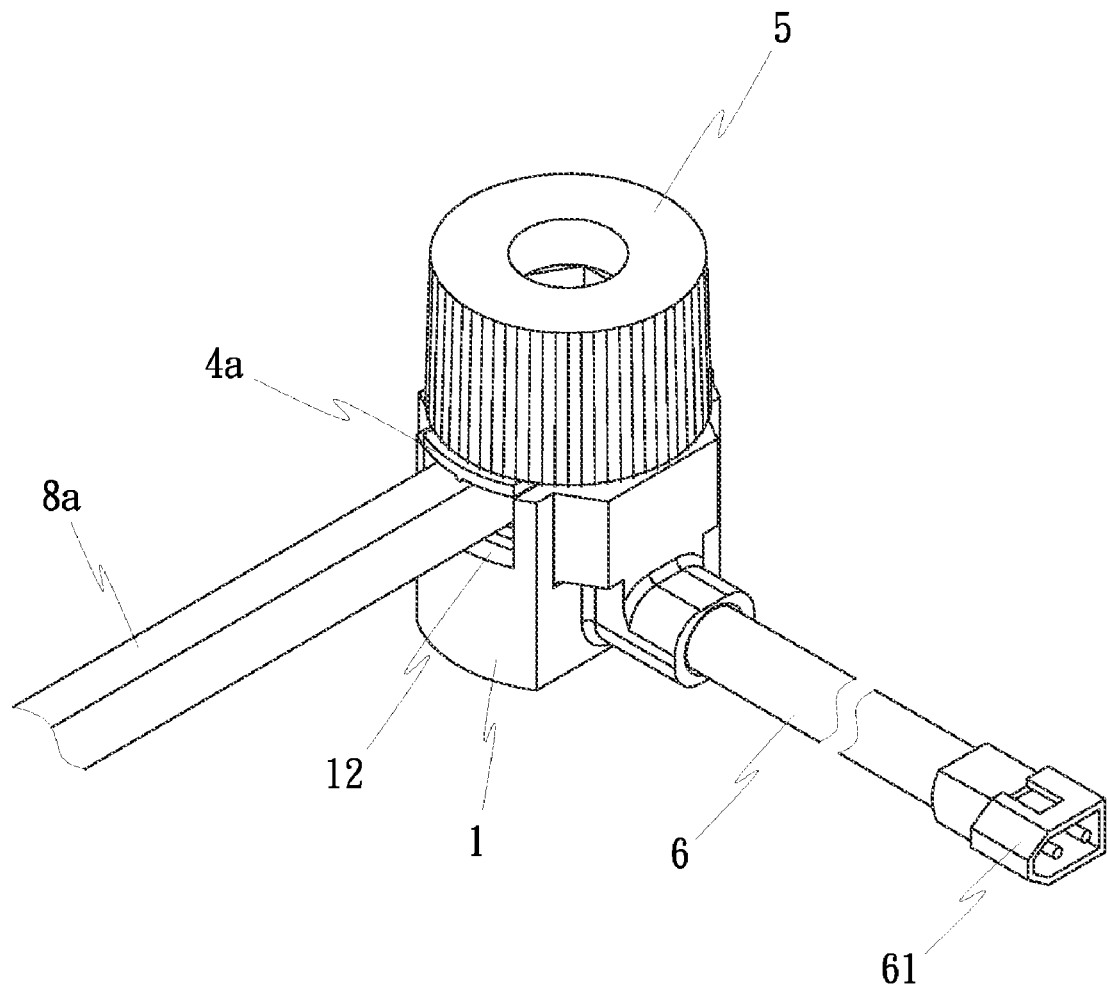
FIG. 1 is an elevational view of a watertight junction box in accordance with the present invention.
Figure 2:
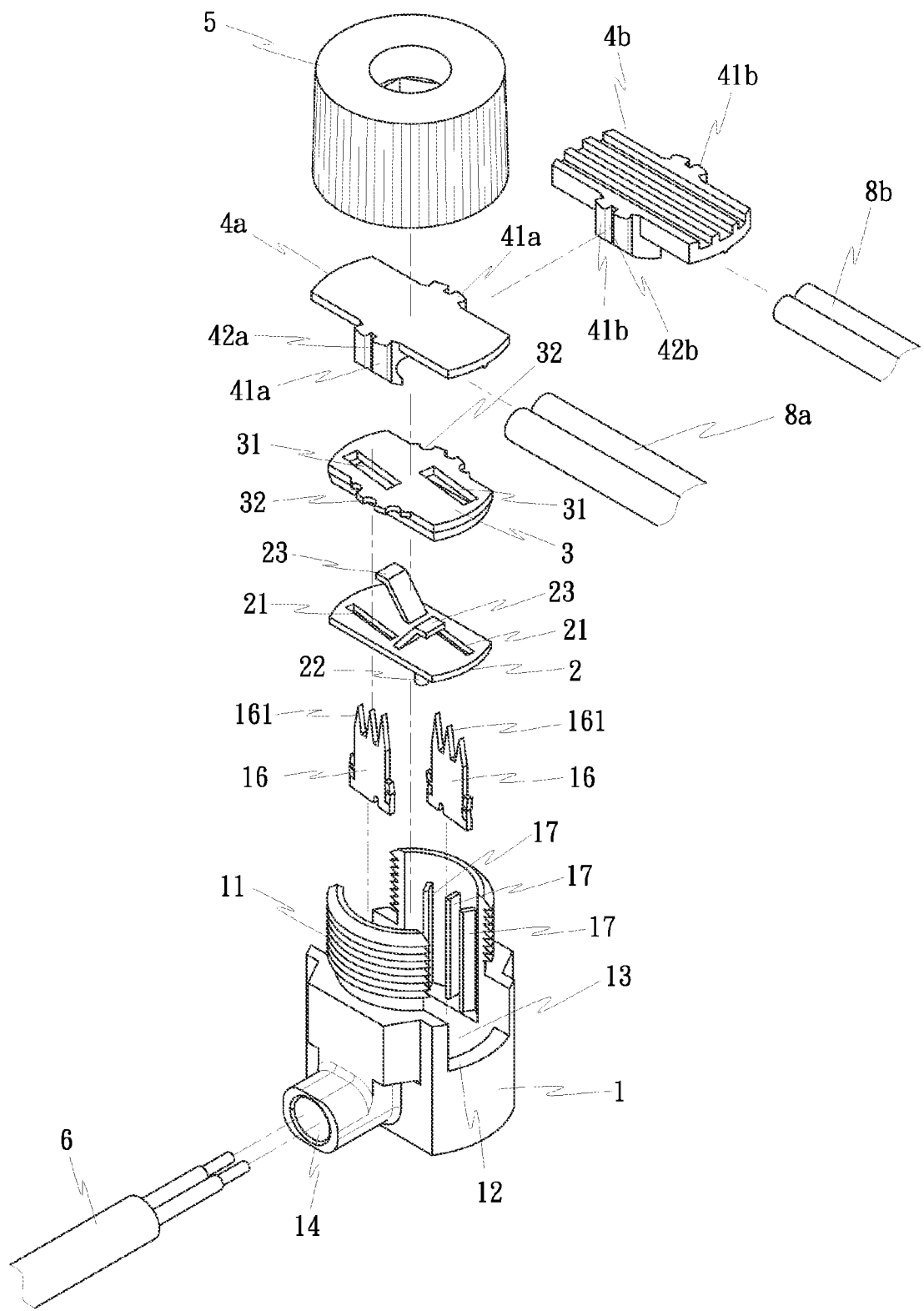
FIG. 2 is an exploded view of the watertight junction box in accordance with the present invention.
Figure 3:
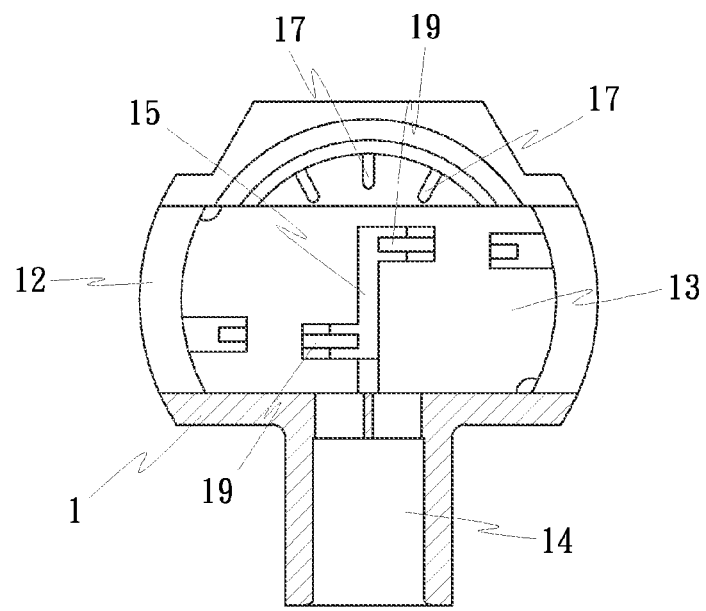
FIG. 3 is a cross sectional view of the box body of the watertight junction box according to the present invention.
Figure 4:
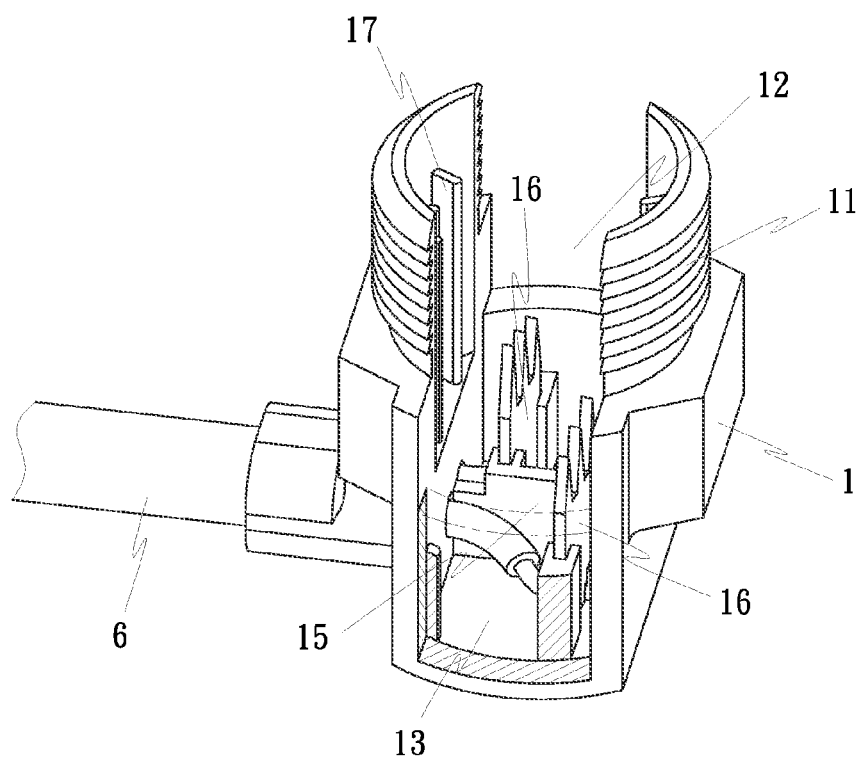
FIG. 4 is a sectional elevation of a part of the watertight junction box in accordance with the present invention.
Figure 5:
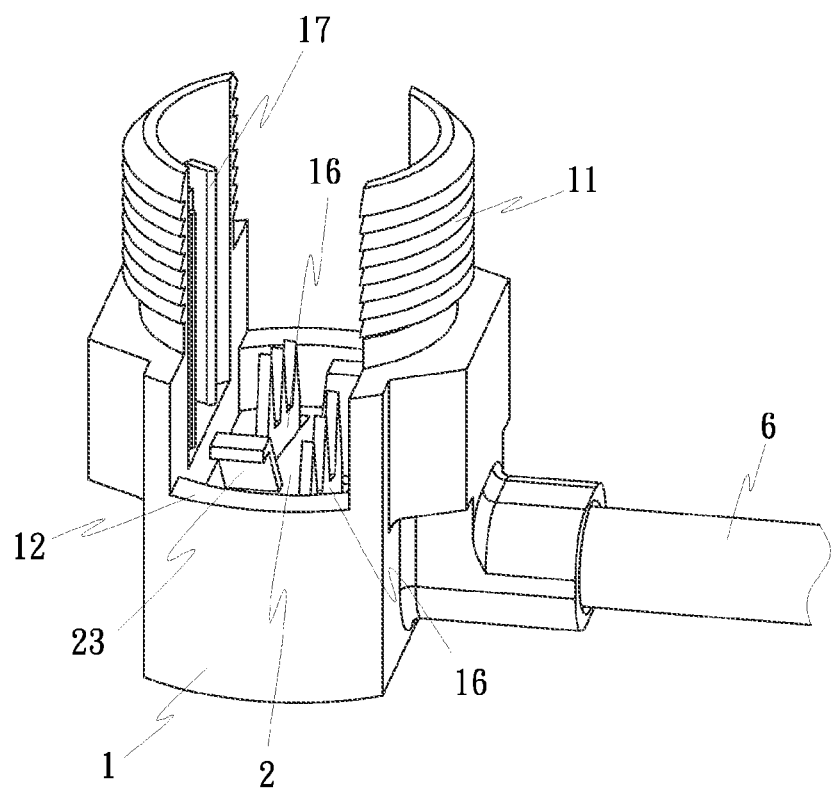
FIG. 5 is an elevational view of a part of the present invention, showing the lower floating plate mounted in the accommodation chamber inside the box body.

As shown in FIGS. 1~5, a watertight junction box in accordance with the present invention comprises a box body 1, a lower floating plate 2, an upper floating plate 3, a holding down plate 4a or 4b and a lock cap 5.

Figure 6:
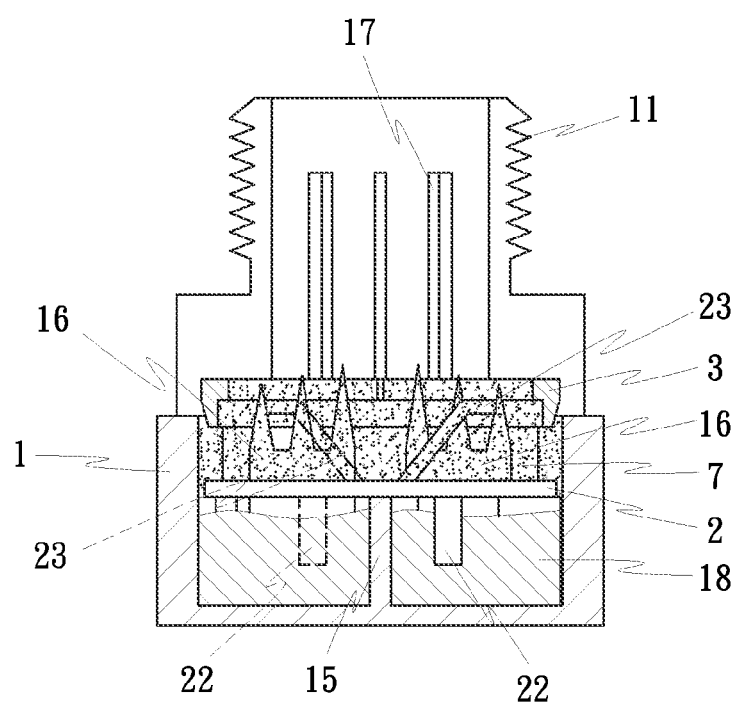
FIG. 6 is a sectional side assembly view of a part of the watertight junction box in accordance with the present invention.

The box body 1 is a hollow member comprising a threaded neck 11, an opening 12 transversely cut through the threaded neck 11 to separate the threaded neck 11 into two symmetrical halves, an accommodation chamber 13 defined beneath the threaded neck 11 (see FIG. 2 and FIG. 3), an insertion hole 14 cut through one side of the accommodation chamber 13 for the insertion of a modular cable 6 into the accommodation chamber 13, a partition board 15 disposed inside the accommodation chamber 13 (see FIG. 3 and FIG. 4), two copper contacts 16 mounted in the accommodation chamber 13 at two sides relative to the partition board 15 and a plurality of ribs 17 located on the inside wall of each of the two symmetrical halves of the threaded neck 11. Further, each copper contact 16 has a plurality of sharp top protrusions 161. After the modular cable 6 is inserted into the insertion hole 14, the copper contacts 16 are respectively forced with the bottom edges thereof into contact with the (conductors of the) modular cable 6, and then a resin glue 18 is filled in the accommodation chamber 13 so that the connection between the copper contacts 16 and the modular cable 6 is embedded in the hardened resin glue 18 (see FIG. 6).

The lower floating plate 2 is a flat plate having two through holes 21 for the copper contacts 16 to pass through, two bottom legs 22 diagonally disposed at the bottom side and two springy supporting strips 23 diagonally disposed at the top side. The lower floating plate 2 is inserted into the accommodation chamber 13 of the box body 1 (see FIG. 5), enabling the two bottom legs 22 to be embedded in the resin glue 18 (see FIG. 6).

The upper floating plate 3 is a flat plate having two through holes 31 corresponding to the through holes 21 of the lower floating plate 2 for the copper contacts 16 to pass through and two notched side edges 32 fitting the ribs 17. The upper floating plate 3 is set inside the threaded neck 11 above the lower floating plate 2. Further, a suitable amount of silicon rubber 7 is filled in the accommodation chamber 13 in between the lower floating plate 2 and the upper floating plate 3 (see FIG. 6).

The holding down plate 4a or 4b is selectively used depending upon the thickness of the external electric wire 8a or 8b to be connected. The holding down plate 4a or 4b is a flat clamping plate having a substantially ⊓-shaped cross section and a vertical groove 42a or 42b on each of the two opposite lateral sidewalls 41a or 41b thereof for receiving one of the ribs 17 at each of the two symmetrical halves of the threaded neck 11.

Figure 7:
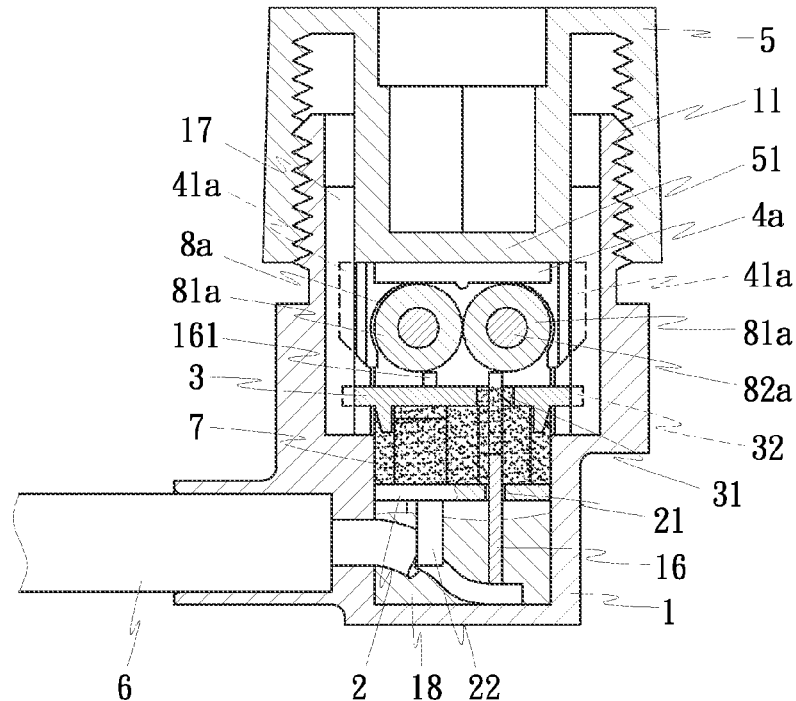
FIG. 7 is a schematic sectional view of the present invention before the lock cap is locked and before a contact is made between the copper contacts and the external power wire.
Figure 8:
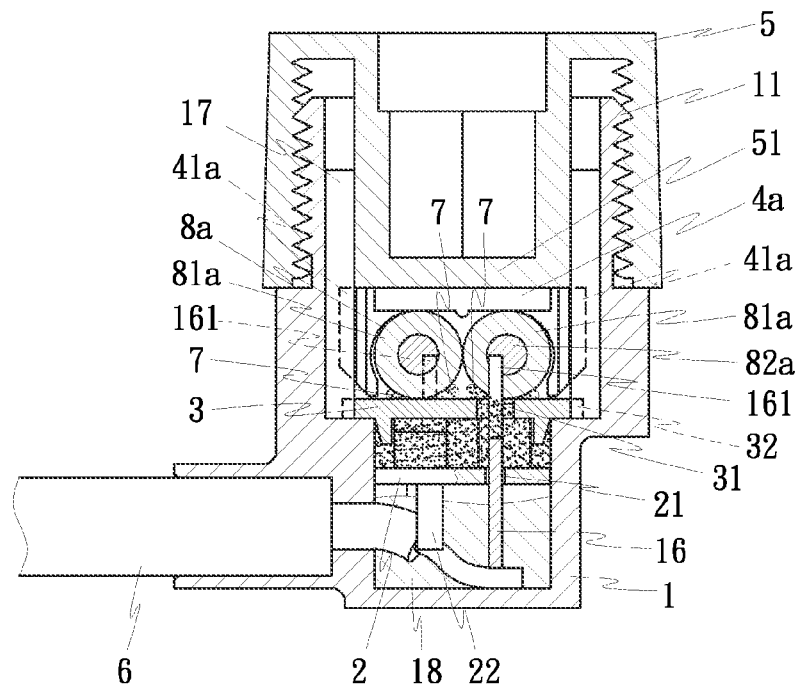
FIG. 8 corresponds to FIG. 7, showing the lock cap locked and the copper contacts cut into the external power wire.

The lock cap 5 is a screw cap for threading onto the threaded neck 11 of the box body 1, having an inside stop wall 51 that curves inwards (see FIG. 7 or FIG. 8).

Figure 10:
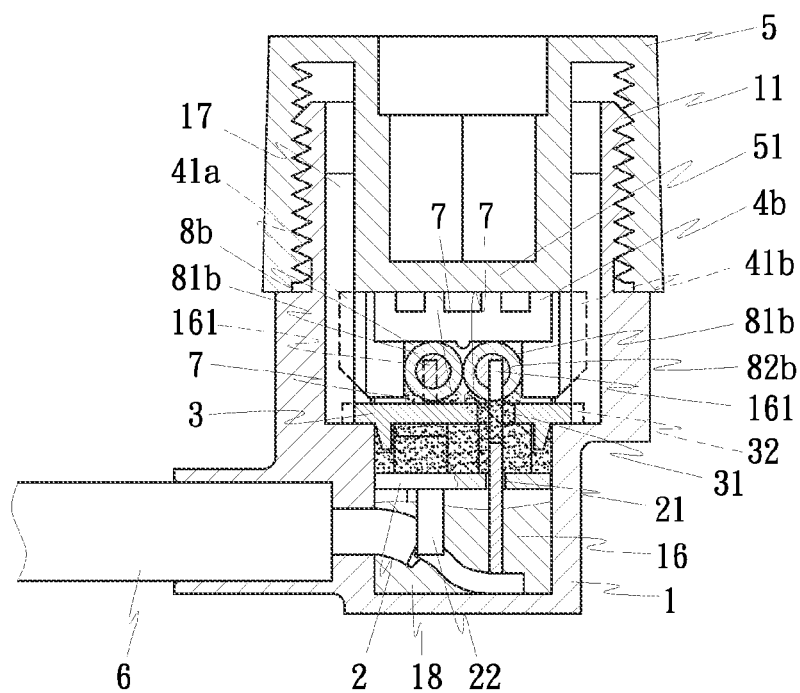
FIG. 10 is a sectional view in an enlarged scale of FIG. 9.

The box body 1, the lower floating plate 2, the upper floating plate 3, the holding down plate 4a or 4b and the lock cap 5 are assembled to form the desired watertight junction box. As stated above, a certain amount of silicon rubber 7 is filled in the accommodation chamber 13 in between the lower floating plate 2 and the upper floating plate 3. During installation, the external power wire 8a or 8b to be connected is set in opening 12 of the box body 1 and transversely extended through the threaded neck 11 and kept between the holding down plate 4a (or 4b) and the upper floating plate 3, and then the lock cap 5 is threaded onto the threaded neck 11 of the box body 1. When threading the lock cap 5 onto the threaded neck 11 of the box body 1, the inside stop wall 51 is forced downwardly against the holding down plate 4a (or 4b), causing the sharp top protrusions 161 of the copper contacts 16 to pierce the outer insulation 81a or 81b of the external power wire 8a or 8b (see FIG. 8 or FIG. 10) and to contact the respective conductors in the external power wire 8a or 8b. At this time, the silicon rubber 7 is compressed to seal the contact area between the copper contacts 16 and the external power wire 8a or 8b (see FIG. 8), thereby protecting the copper contacts 16 against oxidation and corrosion and achieving excellent watertight sealing effects.

The silicon rubber 7 is an elastic material that is able to return to its former shape after being pulled or pressed. After the external power wire 8a or 8b is removed, the silicon rubber 7 immediately returns to its former shape, filling up the space in the accommodation chamber 13 in between the lower floating plate 2 and the upper floating plate 3. Therefore, the watertight junction box of the present invention can be used repeatedly without lowering its watertight sealing function.

Figure 9:
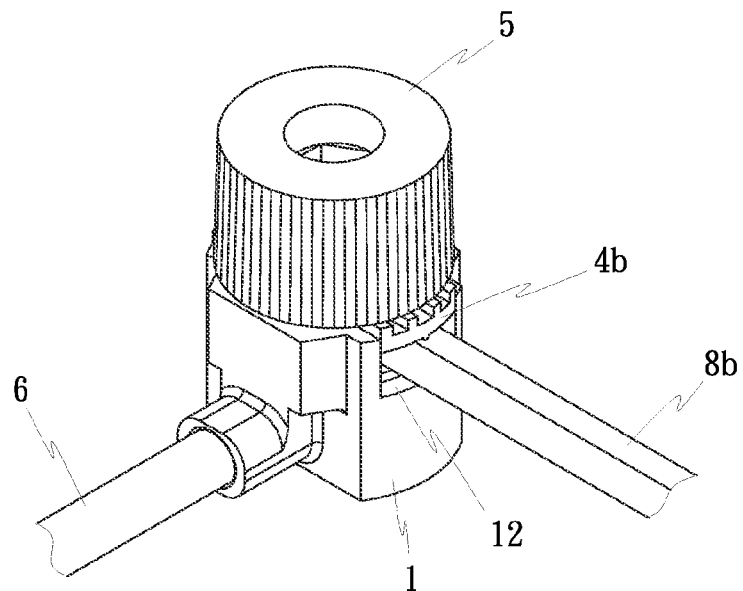
FIG. 9 is an elevational view of the present invention, showing a relatively thinner external power wire installed in the junction box.

The holding down plate 4a or 4b is selectively used depending upon the thickness of the external power wire 8a or 8b to be connected. These two holding down plates 4a and 4b have the same structural design with the exception of the gap width between the two opposite lateral sidewalls 41a or 41b. For example, FIG. 9 shows a thinner external power wire 8b installed in the watertight junction box.

The modular cable 6 is an electrical cable having a modular connector, for example, modular jack 61 at its one end. The other end of the modular cable 6 is inserted through the insertion hole 14 into the accommodation chamber 13 with the two bare conductors separated by the partition board 15 and respectively held down in the accommodation chamber 13 by the copper contacts 16 and sealed by the resin glue 18. Due to the sealing effect of the resin glue 18, the connection between the copper contacts 16 and the modular cable 6 is assured. Further, the box body 1 has two locating grooves 19 defined in the accommodation chamber 13 at two sides relative to the partition board 15 for receiving the copper contacts 16 respectively.

The main feature of the present design is the filling of the silicon rubber 7 in the accommodation chamber 13. When the two copper contacts 16 pierce the outer insulations 81a or 81b and come into contact with the respective conductors 82a or 82b (see FIG. 8 or FIG. 10), the silicon rubber 7 is compressed and deformed to protrude over the through holes 31 of the upper floating plate 3 and to wrap about the contact area between the copper contacts 16 and the conductors 82a or 82b of the external power wire 8a or 8b, thereby protecting the copper contacts 16 against oxidation and corrosion and achieving excellent watertight sealing effects. Therefore, the invention prolongs the work life of the junction box and assures conductive stability.

Further, one single-piece hollow member may be used to substitute for the lower floating plate 2 and the upper floating plate 3 for holding a suitable amount of silicon rubber 7 for allowing the silicon rubber 7 to be compressed and deformed to wrap about the connection area between the copper contacts and the conductors of the external power wire, achieving excellent watertight sealing effects.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A watertight junction box, comprising:
a box body, said box body comprising a threaded neck, an opening transversely cut through said threaded neck to separate said threaded neck into two symmetrical halves for mounting an external power wire, an accommodation chamber defined beneath said threaded neck, an insertion hole cut through one side of said accommodation chamber, a modular cable inserted through said insertion hole into said accommodation chamber, and two sharp copper contacts mounted in said accommodation chamber at two sides and respectively kept in contact with said modular cable electrically;
a lower floating plate set in said accommodation chamber, said lower floating plate having two through holes for said sharp copper contacts to pass through;
an upper floating plate set in said accommodation chamber above said lower floating plate, said upper floating plate having two through holes corresponding to the through holes of said lower floating plate for said sharp copper contacts to pass through;
a predetermined amount of a soft rubber filled in said accommodation chamber in between said lower floating plate and said upper floating plate;
a holding down plate set in said box body and adapted to hold down an external power wire being set in said opening of said box body on said upper floating plate; and
a screw cap for threading onto said threaded neck of said box body, said screw cap comprising an inside stop wall;
wherein when said screw cap is threaded onto said threaded neck of said box body after an external power wire is set in said opening of said box body between said upper floating plate and said holding down plate, said inside stop wall of said screw cap is forced downwardly against said holding down plate, said external power wire, said soft rubber and said lower floating plate, causing said sharp copper contacts to cut into said external power wire and said soft rubber to wrap about the connection area between said sharp copper contacts and said external power wire.

2. The watertight junction box as claimed in claim 1, wherein said box body comprises a partition board disposed inside said accommodation chamber; and said sharp copper contacts are disposed in said accommodation chamber at two sides relative to said partition board.

3. The watertight junction box as claimed in claim 1, wherein said threaded neck comprises a plurality of longitudinal ribs respectively protruding from an inside wall of each of the two symmetrical halves thereof.

4. The watertight junction box as claimed in claim 1, further comprising a resin glue filled in said accommodation chamber so that the connection area between said modular cable and said two sharp copper contacts is embedded therein.

5. The watertight junction box as claimed in claim 4, wherein said lower floating plate comprises two bottom legs diagonally disposed at a bottom side thereof and embedded in said resin glue and two springy supporting strips diagonally disposed at a top side thereof for supporting said upper floating plate.

6. The watertight junction box as claimed in claim 4, wherein said upper floating plate comprises two notched side edges disposed at two opposite lateral sides thereof and configured to fit the internal configuration of said threaded neck of said box body.

7. The watertight junction box as claimed in claim 3, wherein said holding down plate comprises a vertical groove located on each of two opposite vertical sidewalls thereof for receiving one of the longitudinal ribs of said threaded neck.

8. The watertight junction box as claimed in claim 1, wherein said holding down plate comprises two opposite vertical sidewalls, said two opposite vertical sidewalls defining therebetween a gap width equal to the thickness of the external power wire to be connected.

9. The watertight junction box as claimed in claim 1, wherein said modular cable has one end inserted through said insertion hole into said accommodation chamber and electrically connected via two bare conductors thereof to said sharp copper contacts and an opposite end extending out of said box body and terminating in a modular connector; and said box body further comprises a resin glue filled in said accommodation chamber so that the connection area between said modular cable and said two sharp copper contacts is embedded therein.

10. The watertight junction box as claimed in claim 1, wherein said box body further comprises two locating grooves for mounting said sharp copper contacts.

11. The watertight junction box as claimed in claim 4, wherein said soft rubber is a silicon rubber that returns to its former shape after being pressed.

* * * * *